June 1, 1926.
V. HEIDELBERG ET AL
1,586,623
METHOD OF AND DEVICE FOR OPERATING INTERNAL COMBUSTION ENGINES
Filed Jan. 10, 1923
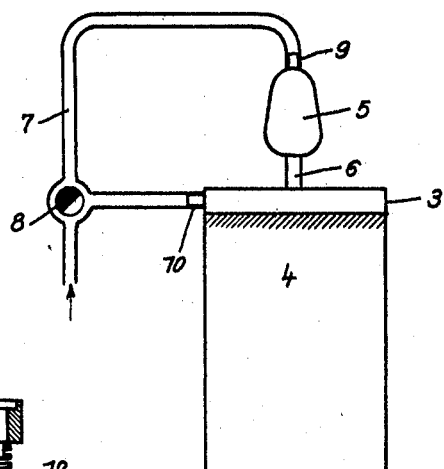
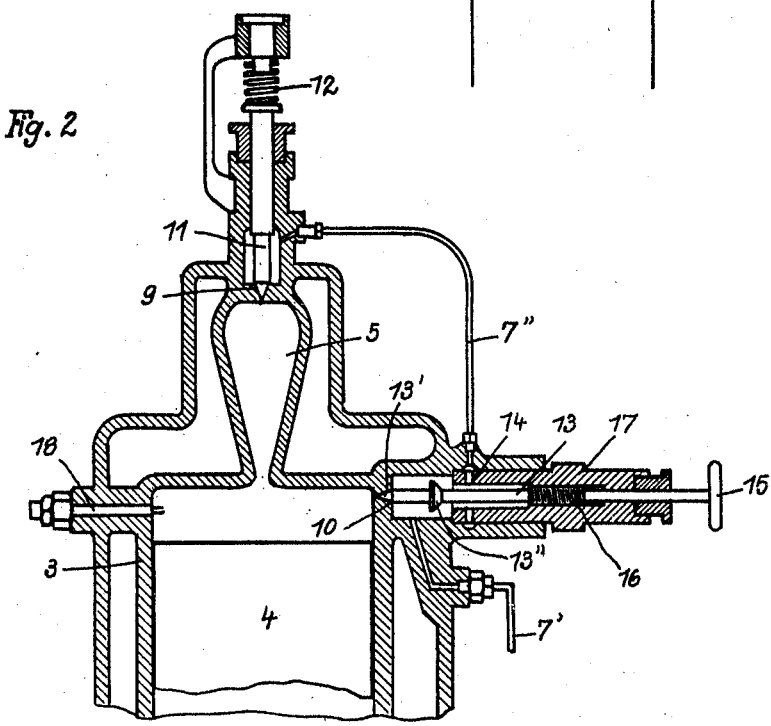
Inventors:
Victor Heidelberg and
Rudolf Müller
per: *[signature]*
Attorney.

Patented June 1, 1926.

1,586,623

UNITED STATES PATENT OFFICE.

VICTOR HEIDELBERG, OF BENSBERG, AND RUDOLF MÜLLER, OF KOLN-DEUTZ, GERMANY.

METHOD OF AND DEVICE FOR OPERATING INTERNAL-COMBUSTION ENGINES.

Application filed January 10, 1923. Serial No. 611,857.

This invention relates to a method of and device for operating internal combustion engines of the type driven by injected fuel.

The invention is based on the problem to provide an internal combustion engine of the kind stated which may be started from the cold condition without the aid of a special ignition device and normally run without the use of compressed air for atomizing the fuel. A well-known solution of this problem is the arrangement of an ignition chamber which is in communication with the interior of the engine cylinder by a narrow opening. This arrangement permits the injection of non-atomized or imperfectly atomized fuel, since the advanced ignition of a part of the fuel taking place in the said chamber will cause the atomization of the remaining fuel.

When such an engine is running, the degree of compression required for obtaining the ignition in the chamber is determined by the necessity that the temperature produced in the chamber by the compression of the gases in combination with the action of the heat of the walls suffices to cause the ignition of the charge. When the engine has to be started, the favorable action of the hot walls does not exist; in order to obtain a self-ignition in the chamber the degree of compression of the gases in the chamber itself must therefore be so high as to exceed the ignition temperature (even with consideration of the cooling influence of the walls). Since the opening of communication between the cylinder and the ignition chamber is narrow as stated above, the pressure during the compression stroke will be higher in the cylinder than in the ignition chamber, so that the degree of compression of the gases in the cylinder must be correspondingly higher, which means that it must even be higher than would be necessary, per se, for obtaining a self-ignition in the cylinder when the engine is in cold condition. Even if the said opening of communication would be relatively large and the difference of pressure correspondingly low, it would occur that in the moment the fuel is injected the mixture produced in the ignition chamber would be so rich that its liability of ignition in a cold engine would be already low, per se.

Now, according to the present invention, the degree of compression is so much decreased that, when the engine is in cold condition, the ignition temperature of the fuel is exceeded and the conditions of ignition are created in the cylinder but not in the ignition chamber. In order to start the engine, one or some few auxiliary injections are made directly into the interior of the cylinder until the walls of the cylinder and the chamber have become so hot that ignitions will also take place in the chamber without changing the ratio of compression. The further injections of fuel are then directed into the ignition chamber solely.

With this method, the first injections of fuel which are directed immediately into the cylinder may have an unfavorable efficiency and entail a separation of soot inasmuch as there is used no atomizing air nor any other similar means; as it is, however, the question of only one or some few ignitions, this circumstance is practically without any importance, any deposits of soot will be blown out or subsequently burnt by the succeeding ignitions which take place through the ignition chamber.

The invention will now be described with reference to the accompanying drawings in which:

Fig. 1 is a diagrammatic view of a complete arrangement according to the invention;

Fig. 2 is a sectional view of a constructive embodiment of the subject matter of the invention.

Referring to Fig. 1 first, 3 denotes the engine cylinder, 4 the piston in its uppermost position and 5 the ignition chamber which is in communication with the cylinder 3 by a passage 6. The fuel is fed by a pump (not shown) through a conduit 7 which is provided with a change-over mechanism 8 which permits the fuel to flow either through a nozzle 9 into the ignition chamber 5 or through a nozzle 10 directly into the interior of the cylinder 3.

When starting the engine, the change-over mechanism 8 is turned into the position shown, thereby causing the fuel to be injected by the nozzle 10 into the cylinder 3 until the first ignitions have taken place, whereupon the change-over mechanism 8 is reversed and the fuel caused to flow to the nozzle 9. Instead of dividing the fuel stream in the conduit 7, such division may also take place already in the pump. Besides, separate conducting and feeding means may be provided for the fuel to be supplied to the nozzles 9 and 10. Finally, for starting a fuel may be used which is more easily ignitible than that used for the further working.

As regards the change-over mechanism for directing the fuel either to one nozzle or the other, it is of importance that on starting the engine the main nozzle which opens into the ignition chamber, is tightly closed, while during the normal working the starting nozzle which opens directly into the cylinder must be safely closed, as—disregarding several other drawbacks—a transitory partial opening of the nozzle that should be closed might entail a sooting up of the nozzle mouth by fuel drops lickering through the same. It is also essential to have the closing of the nozzle take place immediately at its mouth, since nozzle openings which remain open for a relatively long time without being operated, are subject to incrustations and choking by half-burnt fuel particles penetrating into the same.

The device illustrated in Fig. 2 fully corresponds to these requirements in a most simple manner. According to this figure, the main nozzle 9 is provided with a fuel valve 11 which is controlled by fluid pressure. The valve 11 is held on its seat by a spring 12 and opened by the pressure of the liquid fuel as soon and as long as fuel is pressed by the pump through the conduit 7″. The starting nozzle 10 is provided with a valve 13 having two cones 13′ and 13″, one 13′ of which is adapted to directly close the nozzle 10 while the other 13″ serves to control a passage 14 which is arranged in the fuel conduit 7′ 7″. The valve 13 is provided with a hand wheel 15 and a screw threaded portion 16 which engages a correspondingly threaded portion of a guide bush 17. By rotating the hand wheel in one direction or the other the valve 13 may be moved into one end position or the other.

The operation of the device is as follows. Fig. 2 illustrates the several parts in the position which they take during the normal working. In this position, the starting nozzle 10 is tightly closed by the cone 13′ while the passage 14 establishes communication between the portions 7′ 7″ of the fuel conduit. The fuel will therefore be pressed by the fuel pump through the conduit 7′ 7″ and the passage 14 into the main nozzle 9. The valve 11 is lifted from its seat by the pressure of the fuel and the latter injected into the ignition chamber 5. In case the engine should be started, the valve 13 is moved into its opposite end position in which it will open the nozzle 10 and close the passage 14 thus interrupting the communication between the portions 7′ and 7″ of the fuel conduit. The fuel pump will now feed its contents solely through the starting nozzle 10 into the cylinder 3, while the main nozzle 9 is held closed by its valve 11 under the action of the spring 12.

Although the starting of the engine will generally take place without the aid of a special ignition device by self-ignition of the fuel injected into the cylinder, yet it is preferable to provide an auxiliary spark plug 18 for use in special cases, such as for instance in case a difficultly inflammable fuel is employed.

Having thus described our invention what we claim as new and desire to secure by Letters-Patent, is:—

1. An internal combustion engine of the type in which ignition is secured by the heat of compression, comprising a cylinder and a pre-combustion chamber, a nozzle opening directly into the engine cylinder to be used for starting the engine and a fuel injecting nozzle opening into the pre-combustion chamber to be used for normally running the engine.

2. An internal combustion engine operated by fuel injection and ignited by the heat of compression comprising a cylinder, a pre-combustion chamber, a narrow passage of communication between the ignition chamber and the cylinder, said passage being adapted to function as a fuel atomizer, a main nozzle opening into the pre-combustion chamber, and a starting nozzle opening into the interior of the cylinder.

In testimony whereof we have signed our names to this specification.

VICTOR HEIDELBERG.
Dr. RUDOLF MÜLLER.